Nov. 14, 1967  J. C. LANIUS. JR  3,352,344
DISHED LOCK WASHER
Filed Aug. 18, 1965
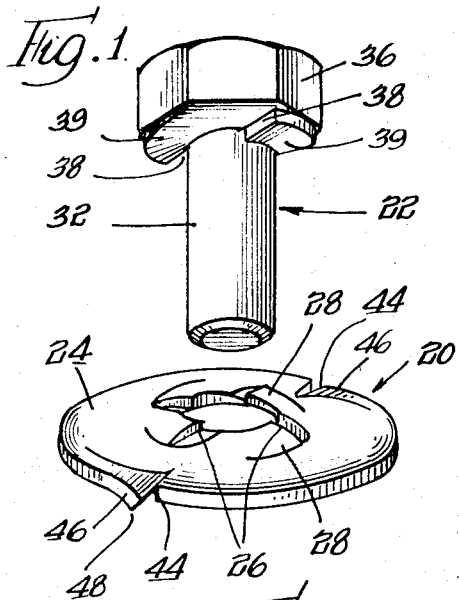
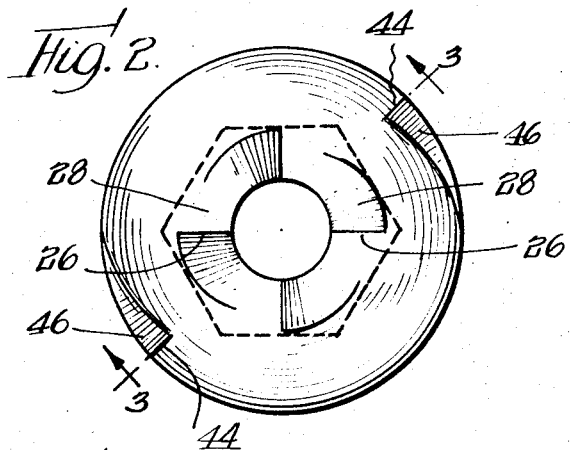
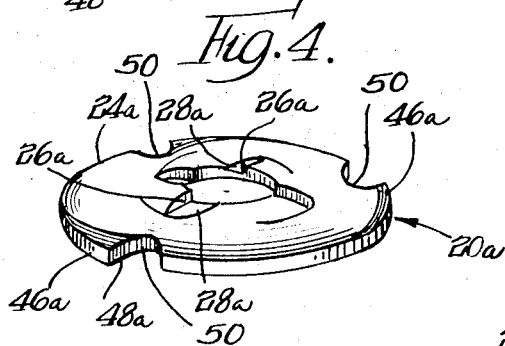
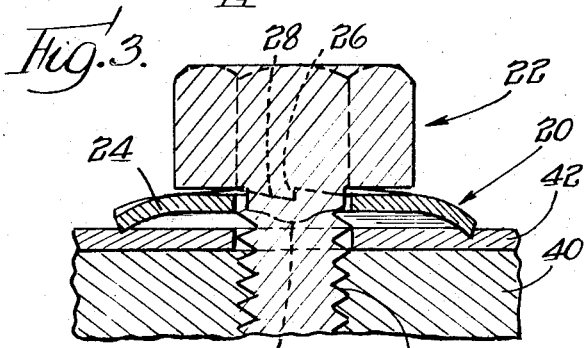
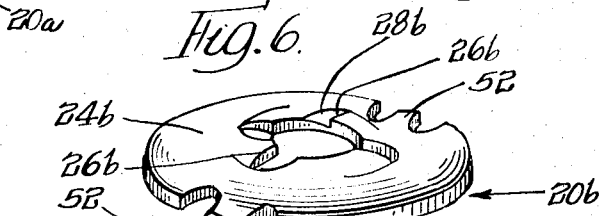
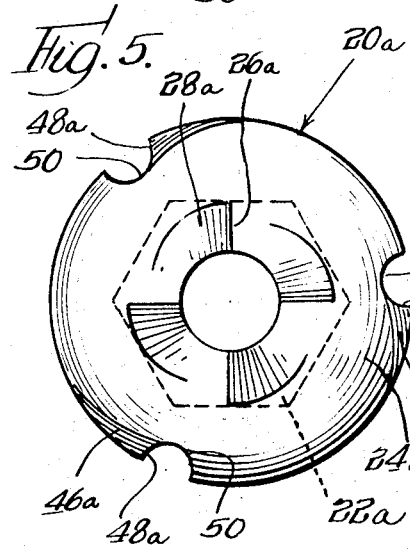
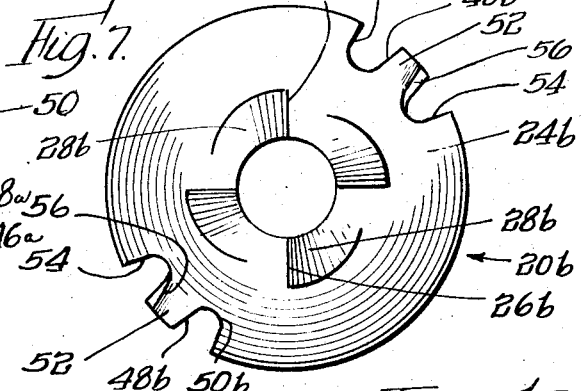
Inventor
James C. Lanius, Jr.
By: Olson, Trexler, Wolters & Bushnell attys.

United States Patent Office 3,352,344
Patented Nov. 14, 1967

3,352,344
DISHED LOCK WASHER
James C. Lanius, Jr., Elgin, Ill., assignor to Illinois Tool Works Inc., Chicago, Ill., a corporation of Delaware
Filed Aug. 18, 1965, Ser. No. 480,673
2 Claims. (Cl. 151—35)

This invention relates generally to fasteners, and more particularly to fasteners of the type in which lock washers are employed to secure rotary threaded members such as screws against loosening.

It has been recognized heretofore that conical or dome shaped washers, sometimes also referred to as dished washers, have certain advantages for use beneath the clamping surfaces of screws and nuts. Such washers tend to flatten out when the threaded fastener is tightened thereby providing frictional engagement with the workpiece and with the underside of the clamping surface of the screw member or nut. In addition, tension is placed on the screw threads themselves, thereby augmenting frictional resistance to loosening.

It has been proposed in the copending patent application of Ougljesa Jules Poupitch, Ser. No. 271,174, filed Apr. 8, 1963, for "Fastener Device," now Patent No. 3,221,792, to provide additional locking means on such a lock washer comprising ramps on the washer near the inner circumference thereof, and complementary ramps on the clamping surface of the screw member or nut in combination with complementary stops on the washer or screw member or nut. Such ramps are of somewhat steeper pitch than the screw threads, and hence forces tending to loosen the screw member or nut cause the complementary cam surfaces to exert even greater axial force on the work piece and on the screw member or nut, thereby augmenting the natural resistance to loosening of a dished washer. The aforesaid Poupitch invention relies on increased friction to resist unauthorized loosening of the threaded fastener and in many instances this is quite sufficient. However, in accordance with the present invention, it is proposed to provide additional, more positive locking means acting between the washer and the work piece to inhibit rotation of the washer relative to the work piece.

Therefore, it is an object of the present invention to provide a dished washer with positive locking means at the outer periphery thereof.

Most specifically, it is an object of the present invention to provide a dished washer with a relatively sharp, cutting edge down-turned at the outer periphery aggressively to bite into accompanying workpiece.

Specifically, it is an object of this invention to provide a dished washer with means at the outer periphery in the form of a twisted tooth to prevent retrograde rotation of such washer.

Other and further objects and advantages of the present invention will be apparent from the following description when taken in connection with the accompanying drawings wherein:

FIG. 1 is a perspective view of a dished washer and screw blank prior to the telescopic association thereof;

FIG. 2 is a top view of the assembled screw blank and washer;

FIG. 3 is an axial sectional view through the assembled screw and washer of FIG. 2, screw threads having been rolled on shank of the screw;

FIG. 4 is a perspective view of a modified form of washer;

FIG. 5 is a top view of the washer of FIG. 4 with the accompanying screw shown in phantom;

FIG. 6 is a perspective view of another embodiment of the washer; and

FIG. 7 is a top view of the washer of FIG. 6.

Referring now in greater particularity to the drawings, and first to FIG. 1, the two parts forming one embodiment of the present invention comprise a dished or conical resilient sheet metal washer 20 and a complementary screw member designated generally by the numeral 22. When a dished washer such as the washer 20 is subjected to axial pressure along its inner margin or crown relative to the outer periphery, it is clamped against a workpiece, as may be seen in FIG. 3. The dished or conical body of the washer is placed under stress and tends to flatten out.

In the perspective view of FIG. 1 it will be noted that the crown or inner margin of the washer body 24 is formed with a plurality of uniformly distributed abutment members 26, there being four such abutment members in the illustrative embodiment. Extending circumferentially or arcuately between the crest or high point of each abutment 26 to the bottom or low point of the next adjacent abutment in a clockwise direction, as viewed from the top of the washer 20 in FIGS. 1 and 2 are cam surfaces 28. These abutments and their complementary cam surfaces can be produced along the crown of the washer 26 by conventional stamping or coining operations. In some instances it may be desirable to so coin the cam surfaces as to provide abutment means or lugs 30 (FIG. 3) below each of the abutments 26. The lugs or abutment means 30 serve to prevent complete collapse of the washer body 24, and thus act to prevent the washer from being stressed beyond its elastic limit. These lugs may or may not be used, depending upon the environment in which the washer is to be used.

In FIG. 1, the screw element 22 is shown before threads have been formed on its shank 32. After this shank 32 has been telescopically associated with the washer, helical screw threads 34 (FIG. 3) are formed by a conventional rolling process. The rolling process increases the maximum diameter of the screw shanks sufficiently to trap the washer rotationally beneath the head of the screw, and thereby to present a fastener unit.

Complementary to the abutment and ramp on the washer, the underside of the screw head 36 is provided with circumferentially spaced abutment means 38 complementary to the abutment means 26 on the washer 20 with the exception that only two abutments 38 are provided on the underside of the screw head as against the four abutments on the washer. Cam ramps 39 are provided into the abutments 38 on the underside of the screw head. When the screw is threaded into work piece 40, the washer is compressed against the overlying work piece 42, and is flattened to a substantial degree, as shown in FIG. 3, the ultimate flattening being limited by the abutments 30.

In addition to the foregoing, and as best will be seen in FIGS. 1 and 2, the washer near its outer circumference or periphery is provided with a pair of diametrically spaced radial slits 44 formed by shearing the sheet metal. The metal in a clockwise direction circumferentially of the slits, as viewed from above, is turned down at 46, more-or-less in the form of a locking tooth having a lower biting edge 48.

As the threaded screw shank 32 is turned in the complementary threaded aperture of the work piece 40, the outer margin of the washer 20 is brought into engagement with the exposed surface of the work piece 42. The abutments 38 on the underside of the screw head 36 engage the respective abutments 26 on the washer 20. Thus, as the washer is initially tightened against the surface of the work piece 42, the outer margin of the washer experiences relative rotation as well as an increase in frictional engagement with said work piece. During this time, the downturned teeth 46 drag across the work piece without undue difficulty. Continuing tightening of the screw within the work piece 40 causes the annular washer body 24 to be stressed axially. Eventually, as rotation of the washer continues, a stress is reached wherein the frictional engagement of the outer margin of the washer with the work piece and the axial forces resulting from the flattening of the washer body prevent further tightening of the screw 22. Depending on the nature of the sheet metal stock, and the purpose for which the fastener is to be used, the washer body 24 may be flattened until the underlying lugs or abutments 30 bear against the external surface of the work piece 42, thus positively preventing further flattening without stressing the washer beyond its elastic limit.

It will be understood that the angle of inclination of the cam surfaces 28 and 39 is somewhat greater than the angle of the thread convolutions 34 of the screw member 22. Thus, forces tending to loosen the screw 22 must overcome increased frictional resistance between the cam surfaces to effect loosening of the screw. In addition, such forces, since the washer is restrained against reverse rotation by the biting edges 48, tend to cause the ramps 39 to ride up the ramps 28, thereby applying greater axial pressure and causing the biting edges 48 to bite into the work piece 42 with increased vigor, thus tenaciously resisting retrograde rotation of the washer.

It will be appreciated that flattening of the washer has a tendency slightly to stretch the circumference of the washer, thereby imparting a slight radial outward movement as well as rotative movement in installation. This radial movement, however slight, causes the biting edges 48 and the sharp radially outer corners thereof to dig in somewhat radially, and thereby to engage more aggressively with the work piece than would be possible with normal deflected or twisted teeth in a lock washer of the type having a large number of circumferentially spaced twisted lock and key. Note also that the dished shape and the underlying lugs 30 prevent complete collapse of the downturned teeth 46 which would render the biting edges 48 less effective.

For most purposes the washer of FIGS. 1-3 is entirely satisfactory. However, it will be appreciated that the shear line 44 does provide a sharp point at the inner edge where a fracture could start. To avoid such a possibility, the embodiment of FIGS. 4 and 5 is provided. The washer is generally similar to that heretofore shown and described, and repetitious disclosure is avoided by the use of similar numerals with the addition of the suffix a to identify like parts. The essential difference resides in that three semi-circular cutouts 50 are made at equally spaced locations on the periphery or circumference of the washer 20a to provide the biting edges 48a and the downturned accompanying tooth portions 46a. With this form of the washer, there are no sharp cut corners and hence no place for incipient fracture.

A further modification of the invention is shown in FIGS. 6 and 7. The washer again is basically the same as originally disclosed, and repetitive discussion again is avoided by the use of similar numerals with the addition of the suffix b to identify like parts. The essential distinction resides in the provision at two diametrically spaced locations of twisted locking teeth 50b, each formed by more-or-less semi-circular cutouts 54 respectively lying on opposite sides of the adjacent teeth 52. The teeth are twisted so that the counterclockwise meeting edge is turned down to provide a biting edge 48b as previously disclosed. There is also an upward trailing biting edge 56 which may engage with the underside of certain types of nut or screw members to provide further resistance to unauthorized retrograde movement. It will be observed that the washer in FIGS. 6 and 7 is distinguished from ordinary twisted tooth lock washers in the provision of the dished or conical body, and in the provision of a continuous margin throughout most of the washer body periphery.

From the foregoing, it will be apparent that the present invention contemplates an improved fastening device which increases the locking efficiency of a dished or dome-shaped spring washer. The structural features, and particularly the downturned biting edges at the outer circumference or margin of the washer, and especially in combination with the camming action at the inner margin, greatly increase the locking efficiency of a dished or dome-shaped spring washer.

By having the locking teeth equally distributed along the outer margin as shown in FIGS. 4 and 5 of the drawings the washer will rest against a work surface free from any tendency to rock or tilt. In other words when three or more equally distributed teeth are employed along the outer margin, the washer may be tightened against a work surface with the clamping forces equally distributed along the outer margin of the washer. While in FIG. 5, a washer is shown which is formed with work abutting means 30 to prevent complete flattening of the washer when clamped against the work surface such abutment means may be eliminated in instances where complete collapsing of the washer is not an important factor. As shown in FIGS. 4 and 5 the abutments 26a and associated cam surfaces 28a are coined without producing an abutment on the underside similar to the abutment 30 illustrated in FIG. 3.

As will be understood, the invention is not limited to the specific embodiments which are set forth for illustrative purposes, but also includes all such structural changes as come within the spirit and scope of the appended claims.

The invention is claimed as follows:

1. A locking device including a dished, axially resilient peripherally continuous annular washer of sheet metal having an uninterrupted inner margin adapted to be positioned about a rotary threaded fastener element and beneath a clamping surface associated therewith, substantially axially extending abutment means integral with and spaced circumferentially around said inner washer margin in the vicinity of the washer crown in a position to be engaged by corresponding abutment means on said clamping surface of a rotary threaded fastener as an incident to rotary tightening of said fastener, circumferentially disposed cam surfaces along the washer crowns sloping from a high point adjacent to the top of one abutment means toward a low point and defining the inner extent of said abutment means surface, the inclination of said cam surfaces with respect to the washer axis extending in the same general direction and being of greater inclination than the thread convolutions of said rotary threaded fastener with which the locking device is to be used whereby to increase the effectiveness of the washer to resist loosening after said complementary threaded fastener has been rotated in a tightening direction to urge said washer abutment means in the direction of said rotation and to partially collapse said washer, the outer peripheral margin of said washer having a plurality of symetrically located, substantially radially disposed interruptions therein, said interruptions forming at least a part of relatively sharp work engaging teeth, said teeth having axially deflected substantially radially arranged edges distributed in the concave portion of the washer and which face in a direction opposite to the direction of fastener tightening, the deflection of said portions being such as to permit relative rotary movement of the sharp teeth over the surface of a workpiece upon initial tightening of an associated rotary threaded fastener, and to resist substantially all retrograde rotary movement of said washer relative to said workpiece by reason of said teeth becoming imbedded in said workpiece surface, in response to rotary forces acting in a direction tending to loosen the associated rotary threaded fastener as the abutment means on said rotary fastener impresses an additional axial and collapsing force to the washer as they move up the cam surface of said washer which in turn causes progressively greater imbedment of said work engaging teeth.

2. A locking device as set forth in claim 1 including abutment means oppositely disposed from each of said cam surfaces and extending axially from the concave portion side of the washer to prevent complete axial collapsing of the washer body and of said work engaging teeth deflected from said concave portion of the washer.

References Cited

UNITED STATES PATENTS

| | | | |
|---|---|---|---|
| 794,127 | 7/1905 | Slayton et al. | 151—41 |
| 1,821,312 | 9/1931 | Lillig | 151—38 |
| 2,619,146 | 11/1952 | Poupitch | 151—37 |
| 2,675,844 | 4/1954 | Knohl | 151—35 |
| 2,681,678 | 6/1954 | Hage | 151—37 |
| 2,735,470 | 2/1956 | Poupitch | 151—37 |
| 3,221,792 | 12/1965 | Poupitch | 151—38 |

CARL W. TOMLIN, *Primary Examiner.*

R. S. BRITTS, *Assistant Examiner.*